United States Patent [19]

Sanborn

[11] Patent Number: 4,519,283
[45] Date of Patent: May 28, 1985

[54] BAND SAWMILL

[76] Inventor: Dale Sanborn, South Waterford, Me. 04081

[21] Appl. No.: 516,057

[22] Filed: Jul. 21, 1983

[51] Int. Cl.³ ............................................. B27B 15/00
[52] U.S. Cl. ....................................... 83/104; 83/150; 83/156; 83/417; 83/795; 83/801
[58] Field of Search ................. 83/795, 801, 794, 159, 83/417, 720, 719, 722, 788, 104, 150, 156; 414/23; 198/480, 722

[56] References Cited

U.S. PATENT DOCUMENTS

| | | | |
|---|---|---|---|
| 951,937 | 3/1910 | Bryan | 83/794 |
| 2,427,038 | 9/1947 | Ashman | 83/794 |
| 3,111,146 | 11/1963 | Schnepel | 83/801 X |
| 3,695,316 | 10/1972 | Pluckhahn | 83/794 |
| 3,812,951 | 5/1974 | Fullaway | 83/159 X |
| 4,275,632 | 6/1981 | Ross | 83/795 X |
| 4,289,180 | 9/1981 | Weinzierl | 83/794 X |
| 4,341,248 | 7/1982 | Critchell et al. | 83/719 X |

Primary Examiner—Frank T. Yost
Attorney, Agent, or Firm—McCormick, Paulding & Huber

[57] ABSTRACT

A sawmill utilizing a bandsaw which is movable back and forth in the operation of cutting planks from a log that is cradled in a horizontal position. The cradle and the bandsaw are so arranged that the cutting portion of the saw is inclined at an angle to the vertical and so that the cutting plane is inclined at the same angle. The bandsaw is carried on a sub-frame which reciprocates longitudinally of a main frame of the mill. The main frame is preferably mounted upon wheels so that the mill is portable and can be taken from one forestry location to another.

12 Claims, 9 Drawing Figures

BAND SAWMILL

BACKGROUND OF THE INVENTION

Traditionally, high production sawmills for cutting lumber planks from logs are located in a fixed area for at least many years at a time. The logs to be cut are brought to the mill, and the lumber cut from them is transported from the mill. In such fixed location sawmill operation, the logs are sometimes moved during the sawing operation to be cut by different kinds of saws, including bandsaws. That is, the logs are moved along the sawing plane at the saw, then retracted and again moved through the saw. In some instances the saw, whether it be a bandsaw or other type, is reciprocated relatively to a fixedly held log. These fixed location mills are quite reliable and there's little difficulty encountered, because of the massive size of the mill, in obtaining accurately cut lumber or planks. In all such cutting at fixed location mills, the cutting plane is vertical.

There have also been portable or semi-portable mills provided which operate similarly to the fixed mills of tradition. That is, a portable or semi-portable mill is moved onto a site where lumber logs are plentiful and then put into operation for a limited period of time to avoid the cost of transport of bringing logs to the mill. However, such portable rigs or mills have had some disadvantages. These are largely attributed to the fact that such portable mills are not as large and therefore not as stable as the fixed location mills. Inaccuracies occur in the cutting of lumber from logs, this due to the fact that the portable mills handle the logs as do fixed location mills by cutting on a vertical plane either by moving the log through the cutting saw or by reciprocating the cutting saw relative to the log, all at a vertical plane of cut.

It is a principal object of the present invention to provide a portable sawmill which can be moved from place to place and which will cut lumber as before, but at greater dimensional accuracy, particularly as to thickness.

SUMMARY OF THE INVENTION

In fulfilling the object as stated above, there is provided in accordance with this invention a sawmill mounted on a main frame which can be moved from place to place and held at any place of operation for as long as desired. A bandsaw is mounted on a sub-frame which is reciprocatory on the main frame so as to perform a cutting operation in movement in one direction of travel and to return to the starting point in the opposite direction of travel. The bandsaw mounted on the sub-frame is tilted or inclined at an angle to the vertical, and a cradle or bunk for holding a log in a horizontal position is so arranged on the main frame that it is easily accessible to the cutting portion of the bandsaw during its cutting travel. Further, the cradle or bunk is so made that the log is advanced into the path of the travelling bandsaw or into the cutting plane of the bandsaw in selected increments which determine the thickness of the lumber or planks being cut from the log.

By having the saw canted at the angle of inclination or slant, and by constructing the cradle at a companion angle, the log is firmly held during the cutting operation and the accuracy of cut is greatly enhanced, to the point where it matches the stability and certainty of operation associated with the traditional heavy-duty fixed mill.

DESCRIPTION OF THE ILLUSTRATED PREFERRED EMBODIMENT

Figure 1:
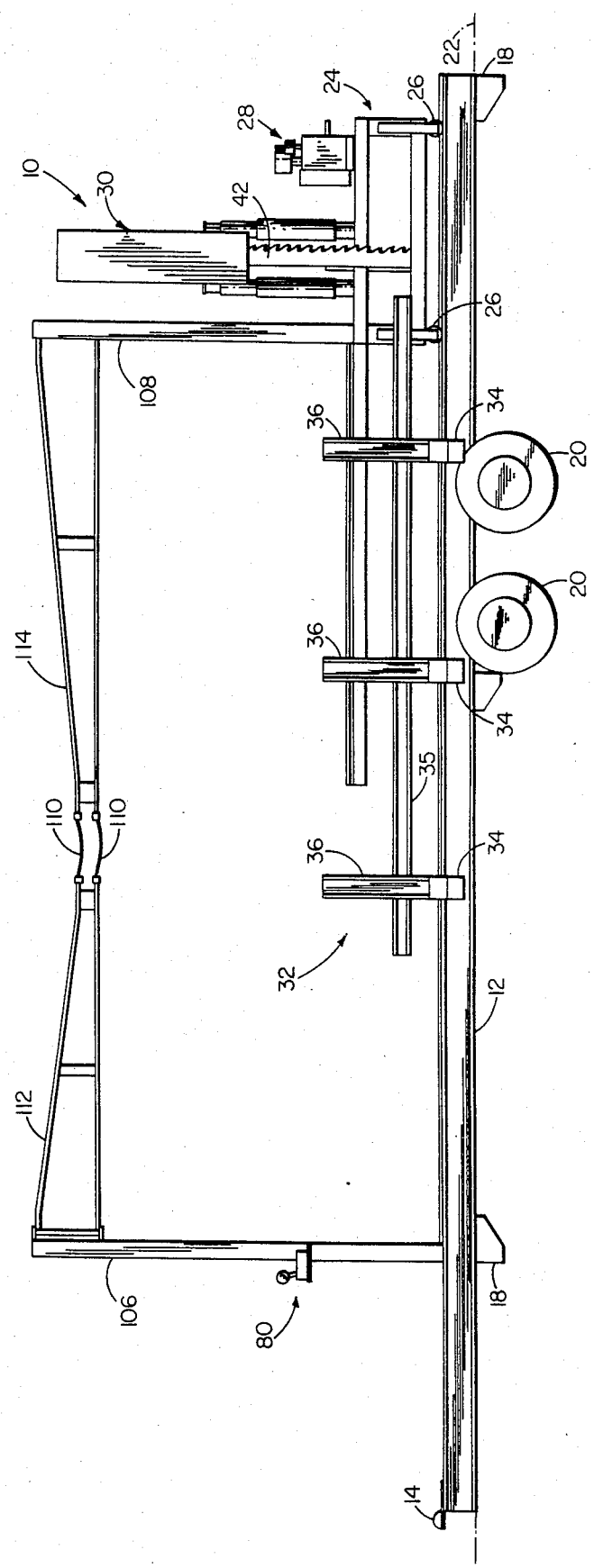
FIG. 1 is an elevational side view of a portable sawmill provided in accordance with the present invention.
Figure 2:
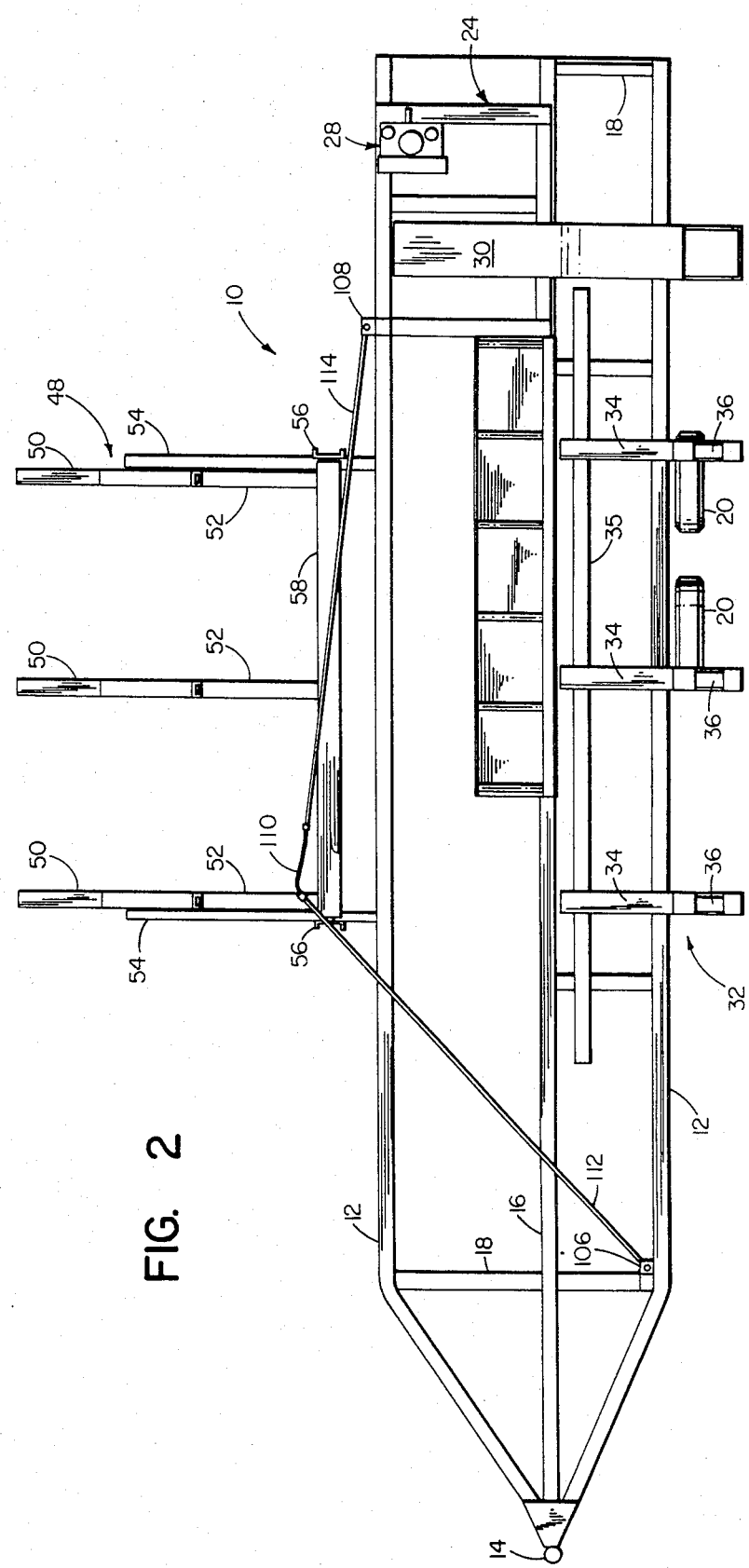
FIG. 2 is a top plan view, to the same scale, of the mill shown in FIG. 1.
Figure 3:
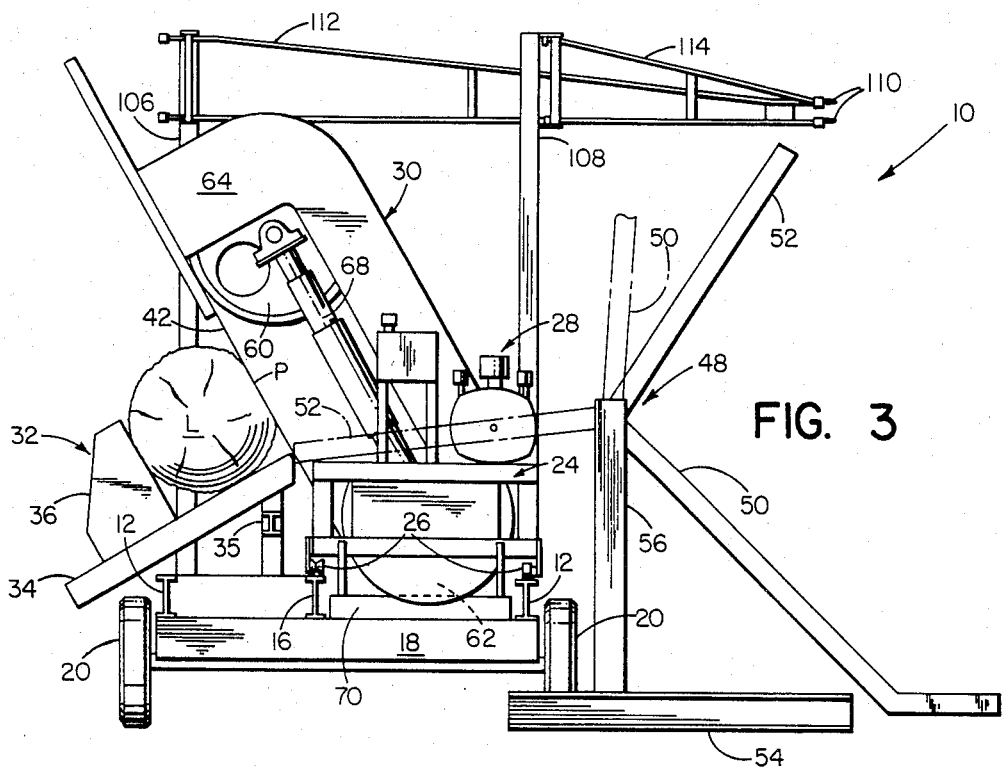
FIG. 3 is a rear end view of the mill shown in FIGS. 1 and 2 in larger scale.

The presently preferred embodiment of a sawmill provided in accordance with the present invention is designated generally by the reference numeral 10 in FIGS. 1, 2 and 3. This mill comprises an elongated main frame having longitudinally extending side rails 12, 12 made of I beams, portions of which converge at the front of the mill (the lefthand end as viewed in FIGS. 1 and 2) to a point where a trailer hitch 14 is located to transport the mill from location to location. The main frame also includes a longitudinal I beam spar 16 which extends from the trailer hitch 14 to the rear end of the main frame, and the main frame also has transverse frame members 18, 18 near the front and at the rear end. This main frame, and thus the whole mill 10, is supported for transportation on transverse axles having wheels 20, 20 at their ends.

A preferred manner of using the sawmill 10 is to bring it to a location and then construct a platform around the main frame preferably at the level of the line designated 22 in FIG. 1. The platform is supported independently of the main frame, which is supported in position on jacks or posts after the mill is located where desired. The platform also provides a stage for walking by an operator of the mill in checking its operation at each end and along the length thereof.

In keeping with this invention, a sub-frame indicated at 24 is mounted on the main frame for longitudinal reciprocation thereon. The means to movably mount the sub-frame 24 comprises rollers 26, 26 which move along one of the side frame members 12 and the longitudinal spar 16, as best shown in FIGS. 1 and 3. The sub-frame 24 supports a drive engine package 28, which will be described in more detail hereinafter, and it also supports a bandsaw structure 30. The bandsaw structure will also be described in greater detail, but at the moment it is significant to note that the saw is tilted from the vertical as best observed in FIG. 3. The preferred angle of tilt is 30 degrees, and the tilt or inclination angle has its apex at the bottom. In FIGS. 1 and 2, the sub-frame 24 is shown at approximately the limit of its movement toward the rear end of the main frame. In moving from a position adjacent the front end of the main frame toward the rear the saw 30 performs its cutting travel and in movement from rear to front it is in the non-cutting mode. In the cutting travel, the sub-frame 24 and saw 30 pass a cradle or bunk indicated generally by the reference number 32. The bunk supports a log L (FIG. 3), and the said cradle or bunk will now be described in greater detail.

Figure 6:
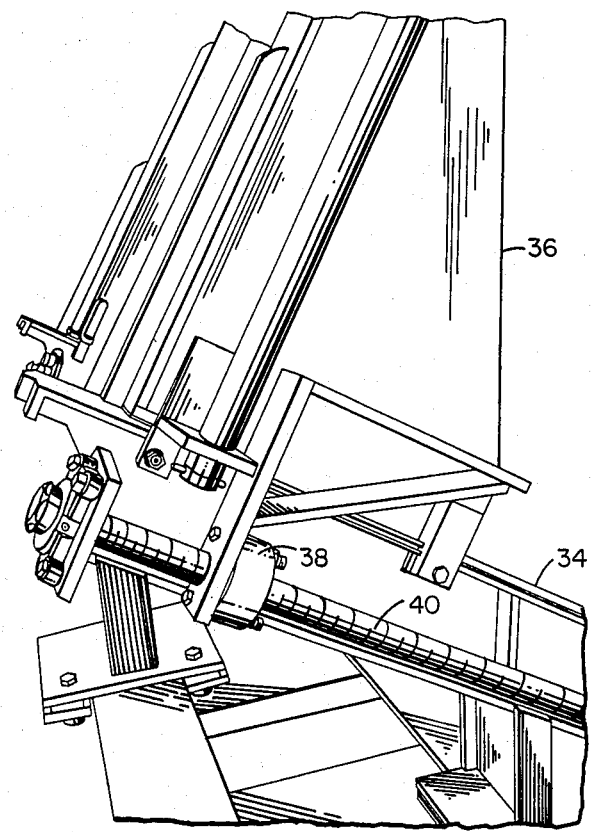
FIG. 6 is a further enlarged detail view of a portion of the structure forming the cradle or bunk for the sawmill.

The preferred form of cradle or bunk includes a plurality of skids 34, 34 which are spaced apart longitudinally of the main frame. These skids are supported at an angle of inclination from the horizontal (preferably and as shown) of 30 degrees by an I beam 35 which extends longitudinally along a substantial portion of the main frame. A headblock 36 is associated with each such skid 34 to be moved along the skid up the angle of inclination in increments. The means for moving the headblock relative to an associated skid is best shown in FIG. 6, and it will be seen that the headblock 36 has a nut 38 secured to its framework, and the nut is threaded onto a lead screw 40. Thus, by rotating the lead screw the headblock is advanced and retracted along the associated skid.

As best seen in FIG. 3, a log L is cradled by the plurality of skids and their associated headblocks. As seen, the log is supported in a horizontal position with the center-line of the log parallel to the longitudinal dimension of the main frame. Thus, whenever the headblocks 36, 36 are moved upwardly along the skids 34, 34, the log L is advanced toward the cutting plane of the bandsaw 30. This cutting plane is, of course, at an angle of inclination (preferably 30 degrees), the apex of the angle of inclination being below the log. As shown in FIG. 3, the plane of cut is identified by the reference letter P, and, obviously, the bandsaw blade 42 (FIGS. 1 and 3) defines the plane P as the subframe 24 and the bandsaw 30 are moved from front to rear of the main frame.

Figure 4:
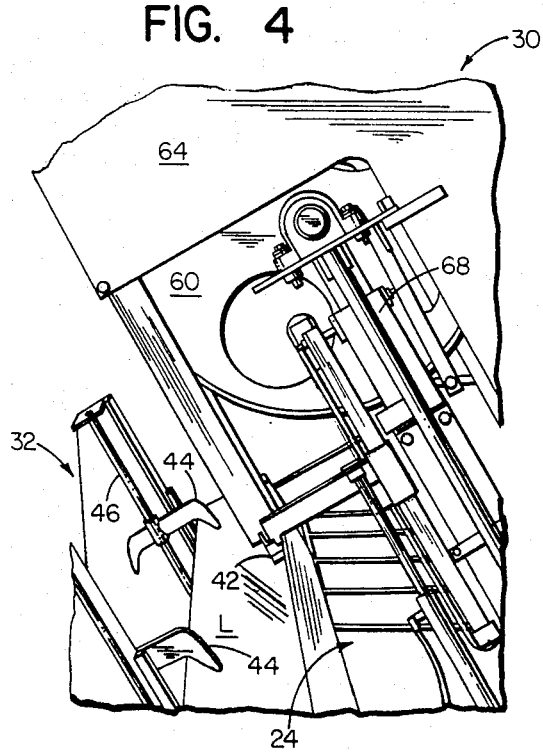
FIG. 4 is also a view from the rear end of the mill, but in still larger scale and showing only a portion of the band saw being used to cut a squared log.
Figure 5:
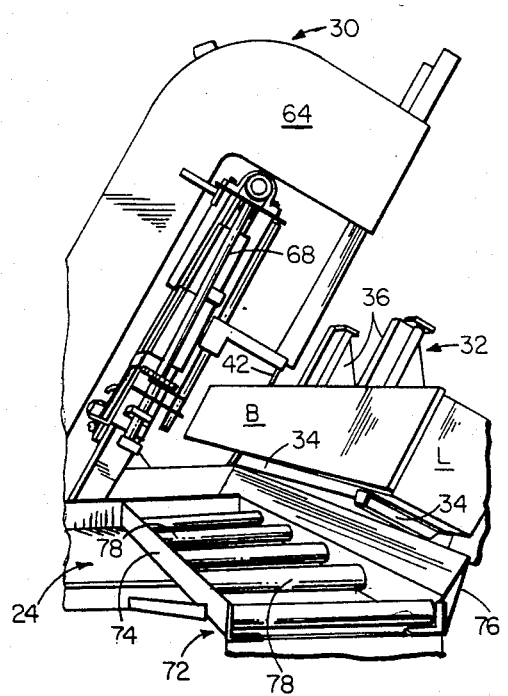
FIG. 5 is a view similar to FIG. 4 but is taken from the front end of the mill.

In operation of the sawmill, after the cutting travel of the bandsaw and after it has been returned to the front of the main frame, the log L is advanced a known increment to determine the thickness of the next plank to be cut from the log. Initially, a rough plank is cut, and then the log is rotated about its center-line 90 degrees, or 180 degrees, to bring a flat cut portion of the log into contact with the skids 34, 34 or the headblocks 36, 36, and another cut is taken. Thus, by rotating the log during the first four cuts, the log is squared-up into a generally rectangular block. The rectangular block shape of the log L is shown at FIGS. 4 and 5. In FIG. 4, it will be seen that holding dogs 44, 44 which are movable along guide rods 46, 46 associated with each headblock 36 engage the log to further assure that the log will remain in place in the cradle.

In the preferred construction of the sawmill, an hydraulically operated forklift type loader 48 is provided to load logs when needed onto the cradle or bunk 32. Such loader 48 comprises a first set of fork arms 50, 50 and a second set of fork arms 52, 52 both of which sets are supported on a common pivot axis. The loader mechanism 48 is best shown in FIGS. 2 and 3, and it will be seen that the mechanism is held in a frame comprising horizontal members 54, 54 at each end and also vertical members 56, 56 at each end. A pivot member to which the sets of arms are secured extends between the vertical frame pieces 56, 56, generally parallel to the longitudinal dimension of the main frame. In FIGS. 2 and 3 the position of the loading arms 50 and 52 to receive a log is shown in full line. It will seen that the set of arms 50, 50 are in position to receive a log rolled onto the arms, and then when the sets of arms are rotated (counterclockwise as viewed in FIG. 3) a log rolled onto the set of arms 50 rolls along said arms onto the arms 52 and on off the arm set 52 onto the skids 34, 34 of the cradle 32. The broken line position of the fork arms 50 and 52 shown in FIG. 3 indicates the position of the loader when the log is supplied to the cradle. Then, of course, the loader structure is returned to its original position to receive the next log. The hydraulic operating mechanism for rotating the loader and lifting a log into the cradle is quite conventional and is not shown.

Turning now to the bandsaw 30, and with particular reference to FIGS. 3, 4 and 5, it is to be noted that the bandsaw is of generally conventional construction, but is tilted from the vertical as has been mentioned. The said bandsaw comprises an upper wheel 60 and a lower wheel 62 for carrying the blade 42 within a hood or guard 64. In further keeping with conventional practice with conventional construction, a mechanism 68 is utilized to mount or train the blade 42 over the wheels 60 and 62 and to apply proper tension to the blade as so mounted. As has been said, the cutting travel of the saw 30 with the sub-frame 24 is from front to rear of the main frame. In order that sawdust may be moved along and off the rear end of any platform utilized with the frame, a scraper 70 is supported on the sub-frame 24 to move along with but slightly to the rear of the lower wheel 62 of the bandsaw 30.

As best seen in FIG. 5, when the bandsaw 30 makes its cutting path in the plane of cut P, a plank or board B is cut from the exposed edge of the log L. The thickness of the board is determined by the amount of advance of the headblocks 36, 36 along the skids 34, 34 in the bunk 32, the advance being made by the operator prior to the cutting travel of the saw. When the saw completes it travel past the bunk 32, the board or plank B will fall away from the log L onto a rollcase indicated generally by the reference number 72. The rollcase 72 is secured to the sub-frame 24 for reciprocating travel therewith, and as seen in FIG. 5 it extends generally longitudinally and is mounted in a horizontal position. The rollcase 72 has sidewalls 74 and 76, the sidewalls 76 being particularly shaped so as to guide a falling board or plank B onto a series of transversely supported horizontal rolls 78, 78. The ends of the rolls are journalled in the sidewalls 74 and 76 and they are spaced apart longitudinally of the main frame.

With this rollcase construction, a board or plank falling into the rollcase at the completion of the cutting stroke will then be carried forwardly of the main frame to an operator's position during the return travel of the sub-frame and saw. The operator can then remove the board and place it on a pile or amoung other previously cut planks.

Figure 9:
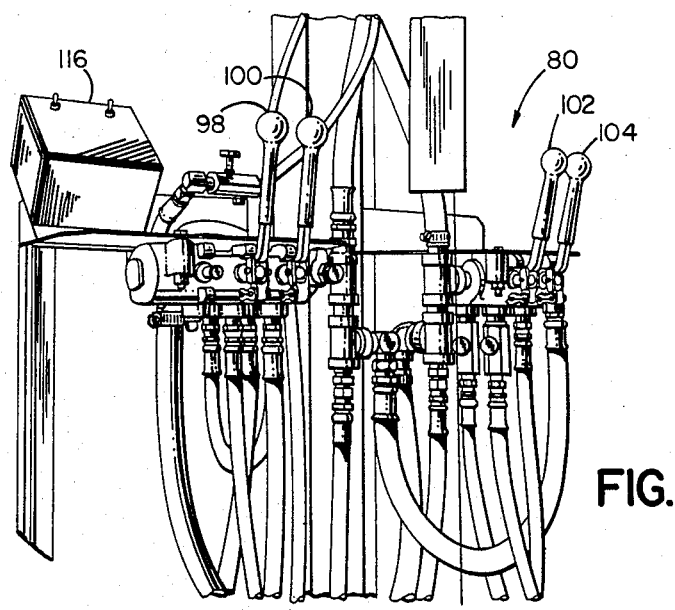
FIG. 9 is a view showing the console which the operator utilizes to control operation of the sawmill of this invention.

During operation of the mill, the operator or sawyer stands on the platform associated with the main frame near the front end of the main frame at a control console indicated generally in FIGS. 1 and 9 by the reference number 80. When standing at the control console 80, the sawyer controls the operation of a drive structure to cause the sub-frame to move rearwardly in the cutting travel of the saw and forwardly in the return travel thereof. He also controls the advance of the headblocks on the skids at the cradle to move the log toward the cutting plane to determine the thickness of planks or boards being cut. He can also control mechanism (not shown) for turning the log about its center-line, and he can control operation of the loader.

Figure 7:
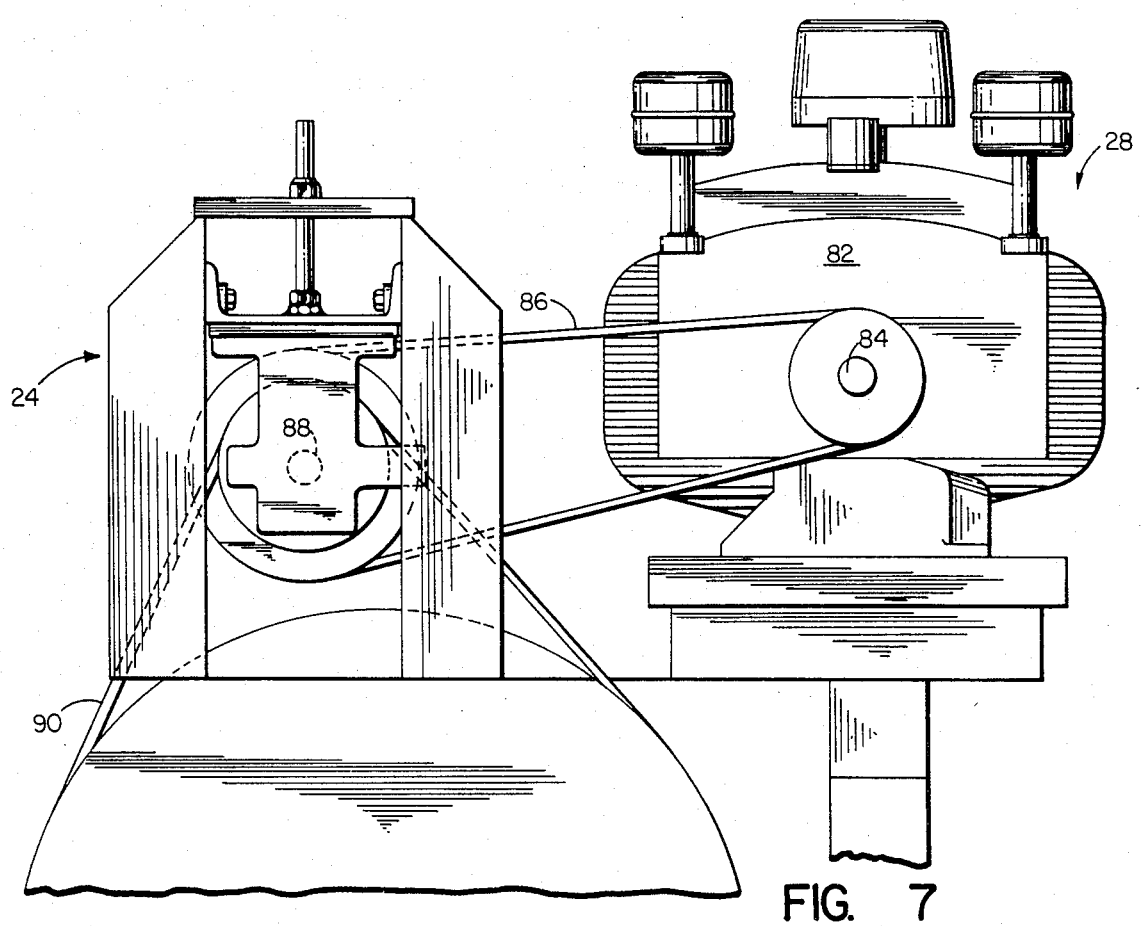
FIG. 7 is an enlarged vertical elevational view of the drive engine and immediately associated drive structure for the mill.
Figure 8:
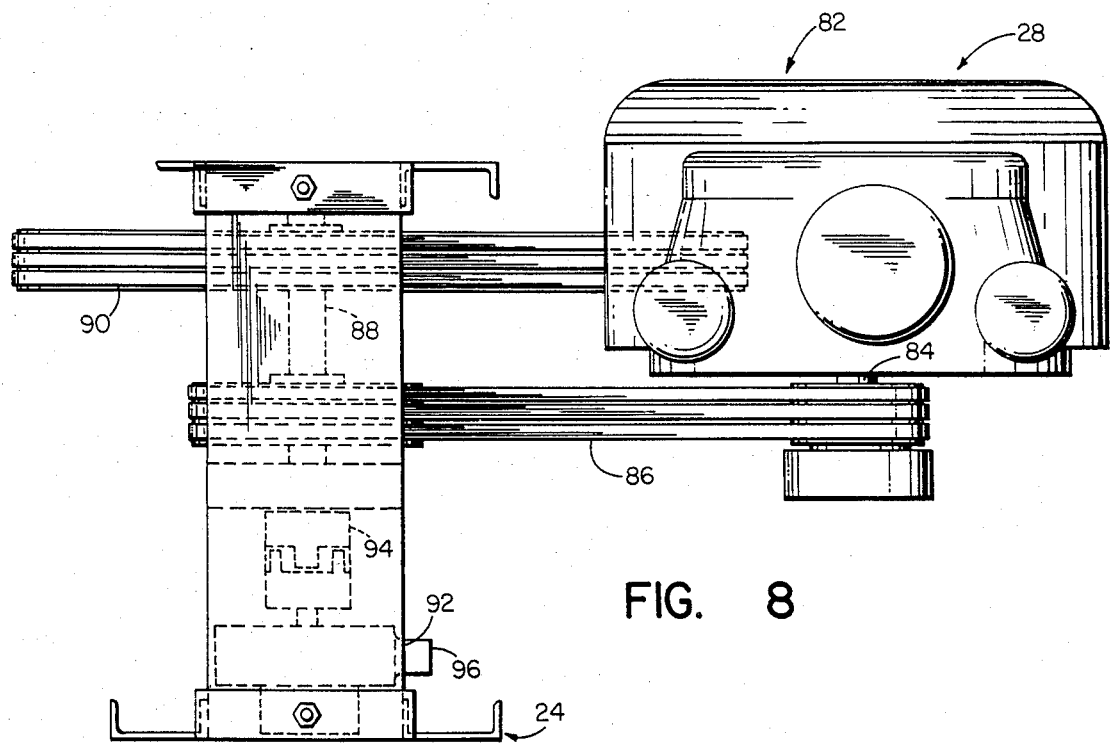
FIG. 8 is a top plan view of the drive structure shown in FIG. 7.

The power source for the drive controlled by the operator comprises a fueled engine 82 (FIGS. 7 and 8). The said engine 82 is a part of the drive package 28 which is mounted upon and travels with the sub-frame 24. The power takeoff shaft from the engine 82 is indicated at 84 and it is connected by a belt and pulley system 86 to operate a drive shaft or jack shaft 88 (FIG. 8). A second belt and pulley system 90 transmits the drive from the jack shaft 88 to the shaft upon which the lower saw wheel 62 is mounted. Thus, the engine 82 drives the saw in a conventional manner utilizing conventional motion transmitting means in the drive train.

The shaft 88 is also connected with a variable speed hydraulic pump or motor 92 by means of a coupling 94. The hydraulic motor 92 has an outlet 96 which is connected to a network of hydraulic lines to the operator's console 80.

At the operator's console (FIG. 9) the operator or sawyer moves a series of levers including at least the levers 98, 100, 102 and 104 to control the operation of the sawmill. The lever 98 operates a valve to control the cutting travel and return travel of the saw and sub-frame, the lever 100 operates a valve to control the operation of the headblocks along the skids at the cradle, the lever 102 operates a valve to rotate the log about its center-line, and the lever 104 may operate a valve to control the operation of the loader 48. The construction of the hydraulically operated means for reciprocating the sub-frame 24 is conventional and is not shown. The hydraulic mechanism or connections for rotating the lead screw 40 at each skid 34 so as to advance and retract a headblock 36 is also conventional and not shown. The mechanism for turning a log on its center-line is conventional and the hydraulic connection to it is not shown. The hydraulically operated mechanism for pivoting the loader 48 is also conventional and is not shown.

It will be observed in FIGS. 1 and 3 that a mast 106 is provided at the operator's station near the console 80, this being a fixed mast, and it will also be seen that there is a mast 108 carried by the reciprocating sub-frame 24. These masts carry hydraulic lines, such as the lines 110, 110 and the lines also are carried by the two arms 112 and 114 of a pantograph structure. The arm 112 is connected to the fixedly located mast 106 and the arm 114 is connected to the travelling mast 108. The connections between the arms and their associated masts are pivotal so as to permit the required movement as the sub-frame and saw are reciprocated.

The operator or sawyer also may utilize an electrical control box 116 at the console 80. This control box may have appropriate switches for operating lights that may be utilized for night operation of the mill and for operating any other electrical mechanisms associated with the mill.

I claim:

1. A sawmill for cutting planks from logs, including an elongated main frame, a portion of which comprises a cradle or bunk to support a log horizontally for cutting, a saw-supporting sub-frame mounted on said main frame for reciprocatory horizontal movement along a substantial portion of its length including the said cradle portion, an endless band saw mounted on said subframe for movement therewith and with its active cutting portion inclined at an acute angle to vertical from an apex below the cradled log whereby to define the plane of cut at said angle to vertical, and means associated with said cradle for periodically moving the log toward the cuting plane at substantially a right angle thereto, whereby during cutting travel of the saw with the sub-frame, a plank of determined thickness is cut from the cradled log.

2. The sawmill of claim 1 wherein the cradle or bunk includes at least one and preferably a plurality of skids spaced apart along the main frame to extend upwardly toward the cutting plane at said right angle, and a head-block movable upwardly along each such skid to advance the cradled log to the cutting plane for cutting a plank of determined thickness therefrom.

3. The sawmill of claim 1 wherein the cutting travel of the band saw and sub-frame is toward the rear end of the main frame and a rollcase is carried by the sub-frame and projects toward the front end of the main frame and is positioned with respect to the cutting plane to receive a plank cut from a cradled log and to carry it forward to a mill operator near the front end of the main frame during return travel of the saw and sub-frame.

4. The sawmill of claim 2 wherein the cutting travel of the band saw and sub-frame is toward the rear end of the main frame and a rollcase is carried by the sub-frame and projects toward the front end of the main frame and is positioned with respect to the cutting plane to receive a plank cut from a cradled log and to carry it forward to a mill operator near the front end of the main frame during return travel of the saw and sub-frame.

5. The sawmill of claim 1 wherein the cutting travel of the band saw and sub-frame is toward the rear end of the main frame and a scraper is carried by the sub-frame to move sawdust during the cutting travel of the saw toward the rear end of the main frame.

6. A sawmill for cutting planks from logs, including an elongated main frame, a portion of which comprises a cradle or bunk to support a log horizontally for cutting, a saw-supporting sub-frame mounted on said main frame for reciprocatory horizontal movement along a substantial portion of its length including the said cradle portion, an endless band saw mounted on said subframe for movement therewith toward the rear end of the main frame in its cutting travel and toward the front end thereof in its return travel, an operator controlled drive mechanism for placing the bandsaw in operation and for reciprocating the subframe and including mechanism for loading a log in the cradle, and means for incrementally advancing the log into the path of the cutting travel of the saw at a right angle, the mechanism for loading a log in the cradle comprising two sets of forks arranged to pivot about a horizontal axis extending parallel to the main frame and generally transversely opposite the cradle, the sets being disposed at an angle to each other from the pivot axis, and the sets being arranged to pivot from a first position where one set may receive a log and lift it as the sets pivot toward a second position wherein the log rolls off said first set and then off the other set of forks into the cradle, a rollcase carried by the sub-frame and projecting toward the front end of the main frame and positioned with respect to the saw to receive a plank cut from a cradled log and to carry it forward to a mill operator near the front end of the main frame.

7. A sawmill for cutting planks from logs, including an elongated main frame, a portion of which comprises a cradle or bunk to support a log horizontally for cutting, a saw-supporting sub-frame mounted on said main frame for reciprocatory horizontal movement along a substantial portion of its length including the said cradle portion, an endless band saw mounted on said subframe for movement therewith toward the rear end of the main frame in its cutting travel and toward the front end thereof in its return travel, an operator controlled drive mechanism for placing the bandsaw in operation and for reciprocating the subframe and including mechanism for loading a log in the cradle, and means for incrementally advancing the log into the path of the cutting travel of the saw at a right angle, the mechanism for loading a log in the cradle comprising two sets of forks arranged to pivot about a horizontal axis extending parallel to the main frame and generally transversely opposite the cradle, the sets being disposed at an angle to each other from the pivot axis, and the sets being arranged to pivot from a first position where one set may receive a log and lift it as the sets pivot toward a second position wherein the log rolls off said first set and then off the other set of forks into the cradle, said band saw being mounted on the sub-frame with its active cutting portion inclined at an acute angle to vertical from an apex below the cradled log whereby to define the plane of cut at said angle to vertical.

8. The sawmill of claim 7 wherein the cradle or bunk includes at least one and preferably a plurality of skids spaced apart along the main frame to extend upwardly toward the cutting plane at said right angle, and a headblock movable upwardly along each such skid to advance the cradled log to the cutting plane for cutting a plank of determined thickness therefrom.

9. The sawmill of claim 7 wherein a rollcase is carried by the sub-frame and projects toward the front end of the main frame and is positioned with respect to the saw to receive a plank cut from a cradled log and to carry it forward to a mill operator near the front end of the main frame.

10. The sawmill of claim 7 wherein a scraper is carried by the sub-frame to move sawdust during the cutting travel of the saw toward the rear end of the main frame.

11. The sawmill as defined in claim 7 wherein the drive mechanism includes an engine having connections to drive the saw and to operate an hydraulic pump for operating other portions of the drive mechanism, said engine and pump being mounted on said sub-frame for movement therewith.

12. The mill of claim 11 wherein a pantograph structure is utilized to carry hydraulic and engine control lines between the travelling sub-frame and an operator's station at the front end portion of the main frame.

* * * * *